United States Patent [19]
Morecroft et al.

[11] Patent Number: 5,503,060
[45] Date of Patent: Apr. 2, 1996

[54] AUTOMATIC DRIP COFFEEMAKER AND THERMAL CARAFE ASSEMBLY

[75] Inventors: Micheal J. Morecroft, Glen Allen; Terry L. Myers, Richmond; Dean C. Warner, Glen Allen, all of Va.

[73] Assignee: Hamilton Beach/Proctor-Silex, Inc., Glen Allen, Va.

[21] Appl. No.: 374,162

[22] Filed: Jan. 17, 1995

[51] Int. Cl.⁶ .............................. A47J 31/24; A47J 31/10
[52] U.S. Cl. ................................ 99/295; 99/304
[58] Field of Search ............................ 99/279, 295, 299, 99/300, 304, 305, 306, 307, 302 R; 426/433

[56] References Cited

U.S. PATENT DOCUMENTS

| | | |
|---|---|---|
| 150,482 | 8/1948 | Wohl . |
| 298,402 | 11/1988 | Seiffert . |
| 1,712,228 | 5/1929 | Payson et al. . |
| 1,877,290 | 9/1932 | Forrest . |
| 2,954,888 | 10/1960 | Bramming . |
| 3,094,448 | 6/1963 | Cornelius . |
| 4,579,236 | 4/1986 | Zimmerman . |
| 4,694,738 | 9/1987 | Tarozzi . |
| 4,721,214 | 1/1988 | Wandel . |
| 4,833,978 | 5/1989 | Martone et al. . |
| 4,882,983 | 11/1989 | Pastrick . |
| 4,924,922 | 5/1990 | Johnson . |
| 4,997,015 | 5/1991 | Johnson . |
| 5,081,915 | 1/1992 | Beumer .................................... 99/306 |
| 5,239,914 | 8/1993 | Salomon et al. ........................ 99/295 |
| 5,251,541 | 10/1993 | Anson et al. ........................... 99/305 |

OTHER PUBLICATIONS

1986 Product Book, front & back cover and p. 12, published by Rowenta—Werke GmbH, 1986.
"1990 Household Products", front cover and pp. 1 through 4 published by Braun Inc., 1990.
"Best General Merchandise Catalog 1990/91", front & back covers and p. 211, item No. 21.
Front & Back covers and p. 4 of brochure published by Hamilton Beach/Proctor—Silex on Jan. 16, 1994.
Front & Back covers and p. 16 (item 16E) of catalog published Feb. 1995 by Horchow, Dallas TX.
Front & Back covers and pp. 12–13 of catalogue published by Crate and Barrel at least as early as Nov. 8, 1994.
Advertisement for Krups "Cafe thek" 8-cup (no date) Coffee/Tea maker (#241), admitted to be prior art.
Advertisement for Philps "Cafetherm HD 5750" dated Nov. 17, 1986.
Advertisement for Braun "Aromaster thermo mit der einzigartigen Warmhalte—Kanne", admitted to be prior art, (no date).
Catalog page (front and rear) published Hamilton Beach/Proctor—Silex, Inc. on Jan. 16, 1994.

*Primary Examiner*—Robert W. Jenkins
*Attorney, Agent, or Firm*—Roger S. Dybvig

[57] ABSTRACT

A coffeemaker has a housing with a water reservoir, a top cover defining a fill port leading to the reservoir, and a heating chamber below the water reservoir. The housing includes a platform on which a thermal carafe can be placed in readiness for brewing. An automatic drip heater assembly pumps heated water to a brew basket which is removably mounted in brew basket holder pivotally mounted on the housing. The coffeemaker is used with a thermal carafe having a housing which houses an insulated container, preferably a double-walled vacuum bottle. A removable top lid is threadedly connected to the top of the carafe housing and has a gasket which, when the carafe top lid is threaded completely onto the housing, is in heat sealing relation to an opening to the insulated container. A brewed coffee conduit extends through the lid and a lid cover is pivotally mounted on the top of the lid between a closed position in which the lid cover covers the conduit and an open position in which the lid cover exposes the conduit. The coffeemaker and the carafe are constructed to avoid vapor locks which would prevent the brewed coffee from flowing directly into the carafe.

9 Claims, 7 Drawing Sheets

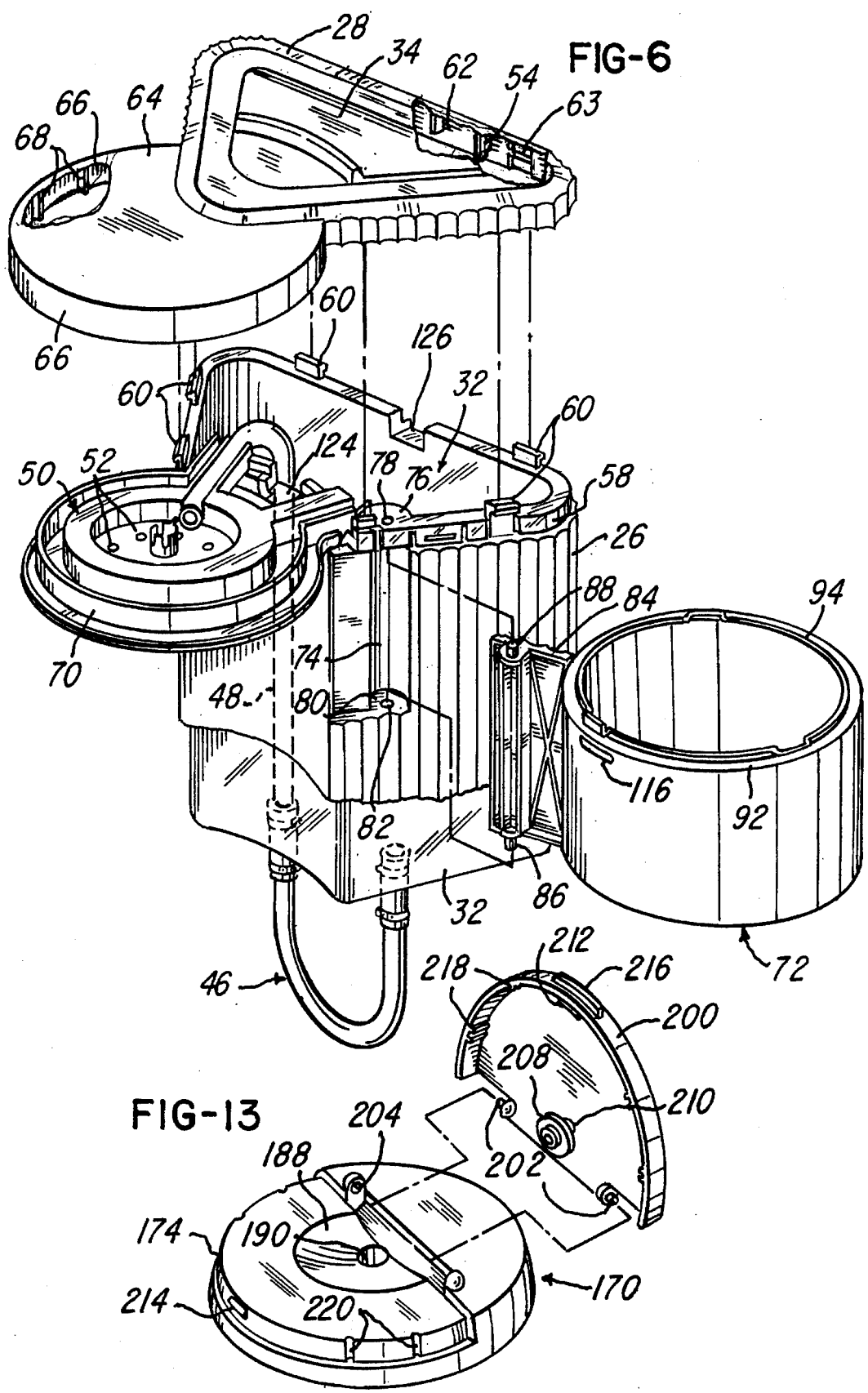

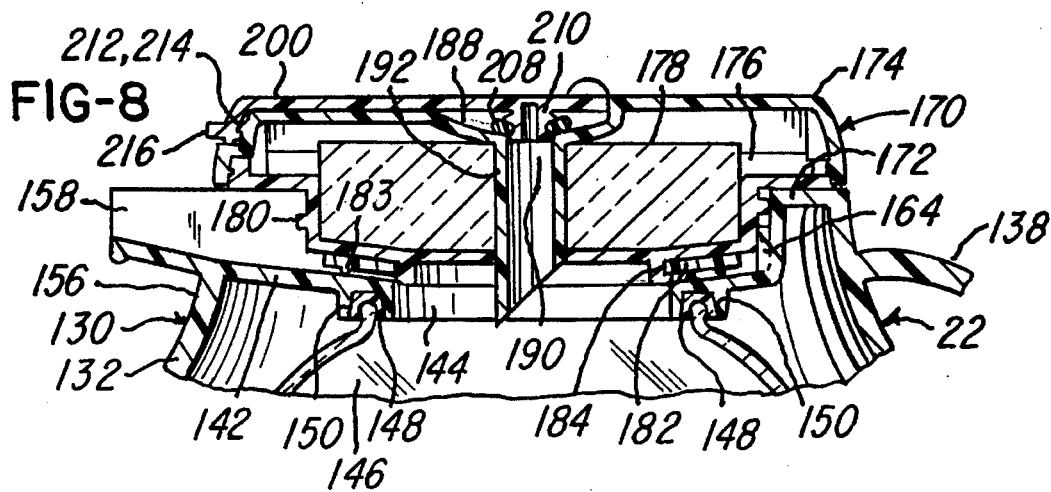
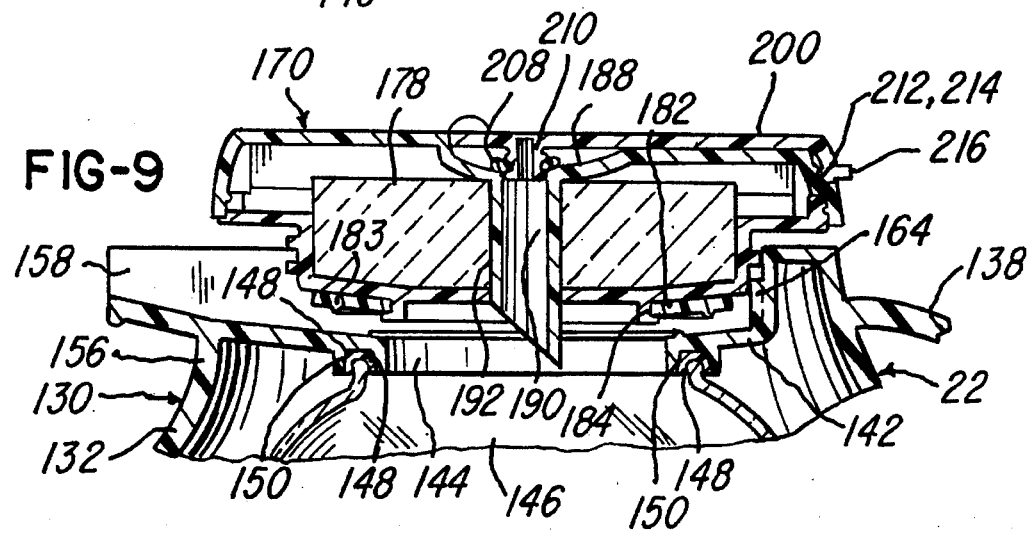
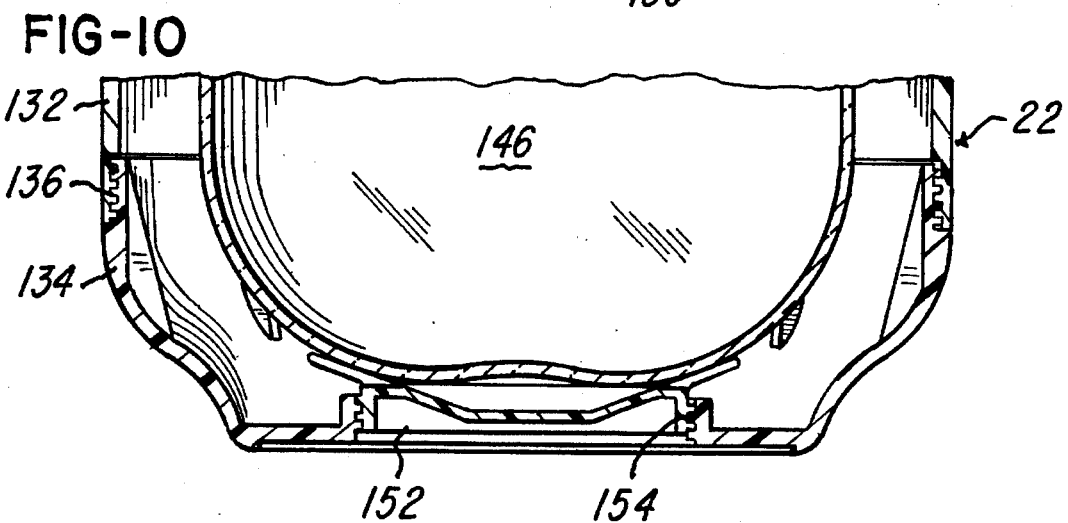

AUTOMATIC DRIP COFFEEMAKER AND THERMAL CARAFE ASSEMBLY

FIELD OF THE INVENTION

This invention relates to an automatic drip coffeemaker and thermal carafe assembly, particularly for household use.

BACKGROUND OF THE INVENTION

Typical automatic drip coffeemakers are used with glass or other carafes which are not insulated. In order to keep the brewed coffee warm over extended periods of time, the coffeemakers have warmer plates on which the carafes rests during and after brewing. However, the continued heating of the brewed coffee changes its chemistry and it soon becomes unpalatable. Thermal carafes are available into which brewed coffee can poured and maintained heated for relatively long periods of time. However, thermal carafes are usually not constructed to take the place of carafes used with a coffeemakers, and are completely separate from the coffeemakers. There are coffeemakers and thermal carafes of specialized constructions with which the brewed coffee passes directly from the coffeemakers into the carafes. These offer the advantage that a separate carafe is not needed for use with the coffeemaker and well as the advantages of a thermal carafe. However, the known coffeemakers and thermal carafes of the latter type are typically complicated in construction and expensive.

SUMMARY OF THE INVENTION

An object of this invention is to provide an improved coffeemaker and thermal carafe assembly. More particularly, an object of this invention is to provide a coffeemaker and thermal carafe assembly which is inexpensive and easy to use.

Related objects of this invention are to provide an improved coffeemaker for use with a thermal carafe and to provide an improved thermal carafe.

A coffeemaker and thermal carafe assembly in accordance with this invention comprises a coffeemaker comprising a housing having a water reservoir, a top cover defining a fill port leading to the reservoir, and a heating chamber below the water reservoir. The housing includes a platform on which a thermal carafe can be placed in readiness for brewing. An automatic drip heater assembly pumps heated water to a brew basket which is removably mounted in a brew basket holder. In the preferred embodiment, the brew basket holder is pivotally connected to the housing.

The assembly further includes a thermal carafe having a housing which houses an insulated container, preferably a double-walled vacuum bottle. A removable top lid is threadedly connected to the top of the carafe housing and has a gasket which, when the carafe top lid is threaded completely onto the housing, is in heat sealing relation to an opening in the housing to the insulated container. A brewed coffee conduit extends through the lid and a lid cover is pivotally mounted on the top of the lid for movement through substantially 180 degrees between a closed position in which the lid cover covers the conduit and an open position in which the lid cover exposes the conduit.

By properly positioning the carafe on the coffeemaker platform with the carafe lid cover in its open position, coffee brewed by the coffeemaker flows into the conduit that extends through the lid and into the insulated brewed coffee container. When the brewing is completed, the carafe can be removed from the coffeemaker, and the top lid cover pivoted to its closed position in which it is held by a snap fit between interfitting parts of the lid and its cover. A sealing gasket on the lid cover seals around the opening to the lid conduit to help retain the brewed coffee hot. Coffee can be poured from the carafe by reversely rotating the lid so the primary sealing gasket at the bottom of the lid is moved out of sealing engagement around the carafe opening.

Other objects and advantages will become apparent from the following description and the drawings.

BRIEF DESCRIPTION OF THE DRAWINGS

FIG. 6 is a fragmentary, partly exploded perspective view, looking generally from in front and above, of a portion of the coffeemaker forming part of the coffeemaker and carafe assembly of FIG. 1. Some of the same parts shown in FIGS. 4 and 5 are also shown in FIG. 6, but the parts are exploded differently in FIG. 6.

FIG. 7 is a fragmentary, cross sectional view of a portion of the coffeemaker and carafe assembly of FIG. 1 and taken along section lines 7—7 thereof.

FIG. 8 is a fragmentary, cross sectional view of the upper portion of the carafe of FIG. 1, with the carafe shown closed.

FIG. 9 is a fragmentary, cross sectional view similar to FIG. 8, but with the carafe shown partly open.

FIG. 10 is a fragmentary, cross sectional view of the lower portion of the carafe.

FIG. 13 is a fragmentary, exploded perspective view of the carafe lid.

DETAILED DESCRIPTION

Figure 1:
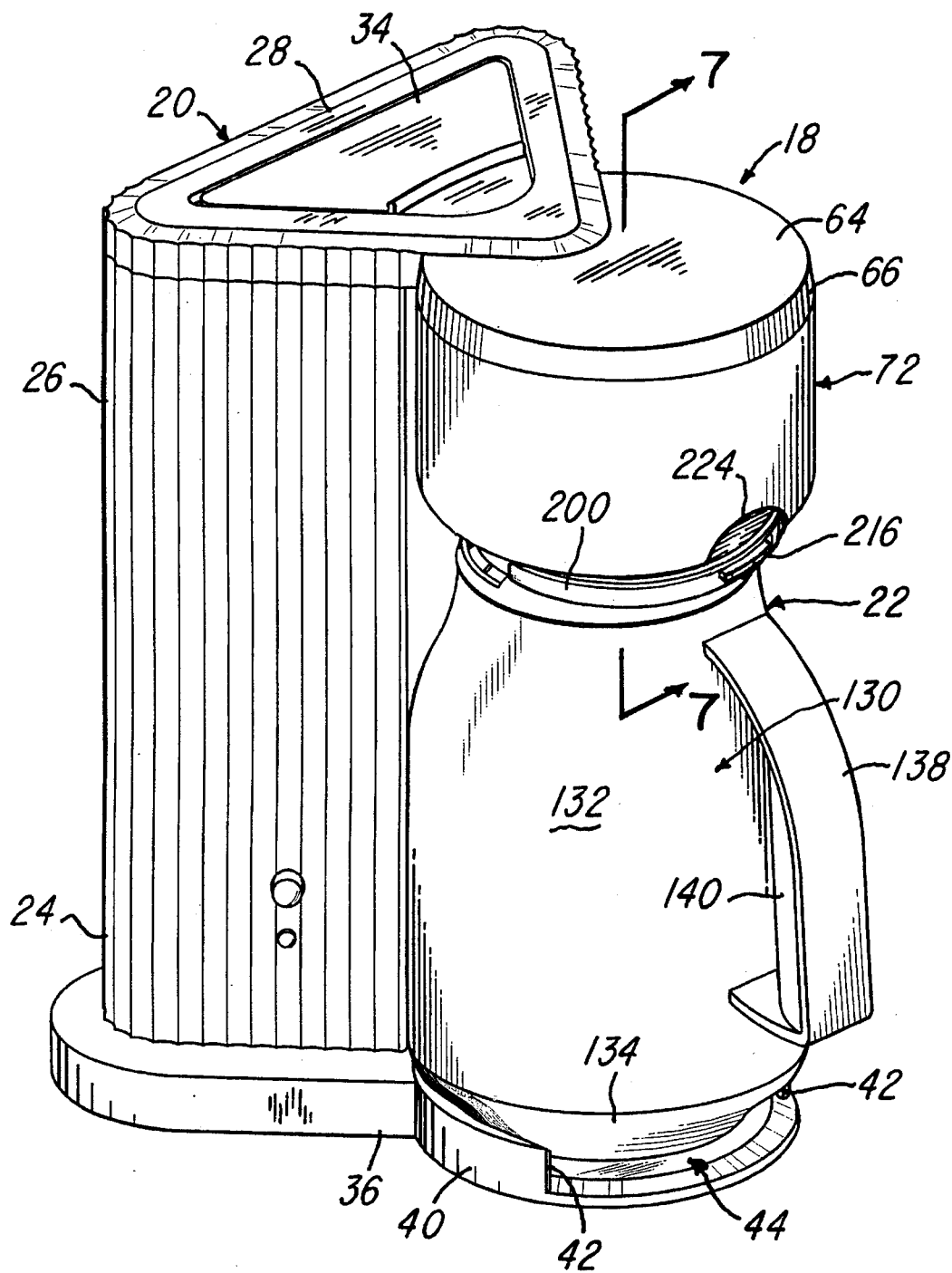
FIG. 1 is a perspective view of a coffeemaker and carafe assembly in accordance with this invention.
Figure 2:
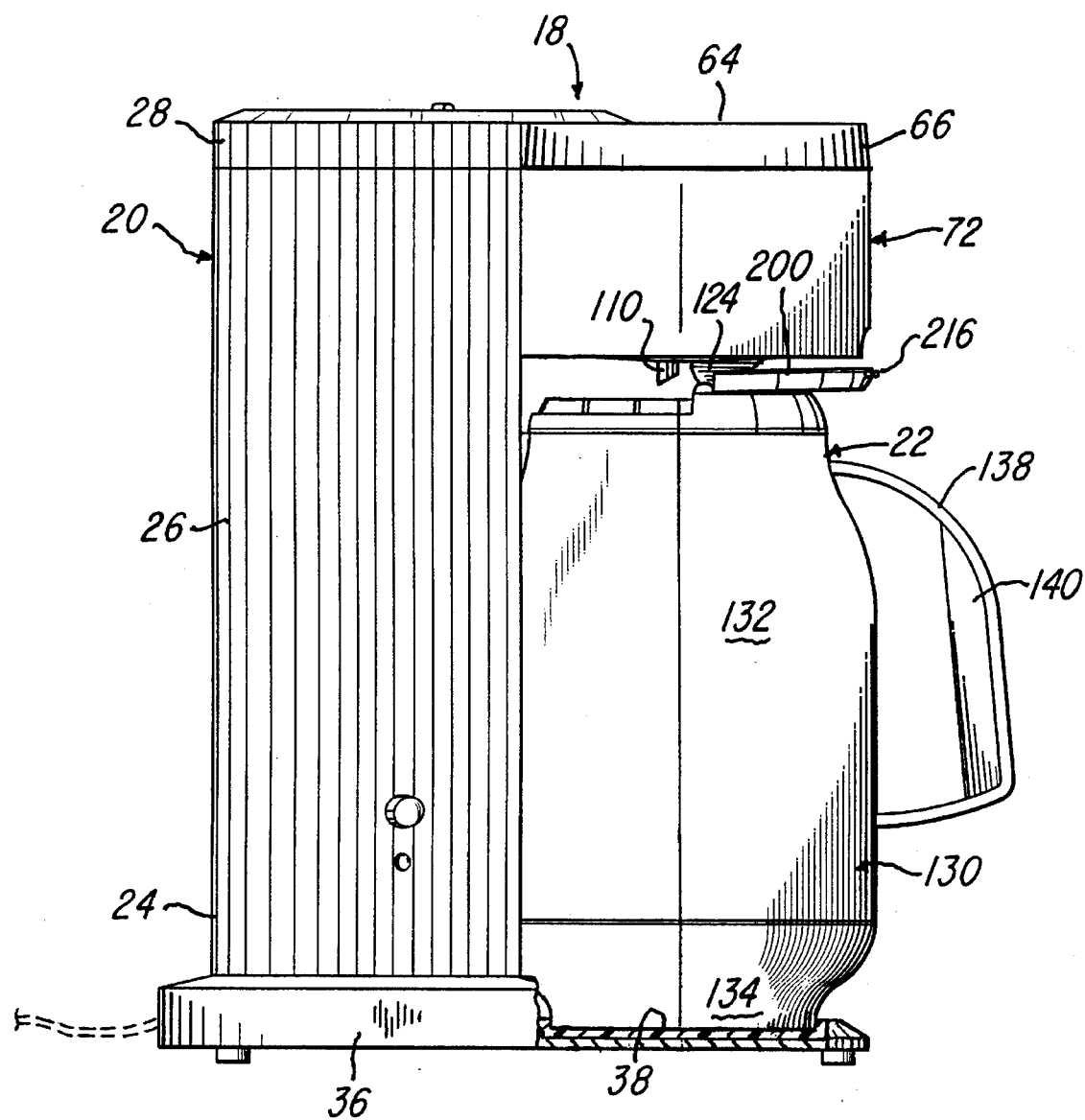
FIG. 2 is a left side elevational view of the coffeemaker and carafe assembly of FIG. 1, with parts broken away and parts in cross-section.
Figure 3:
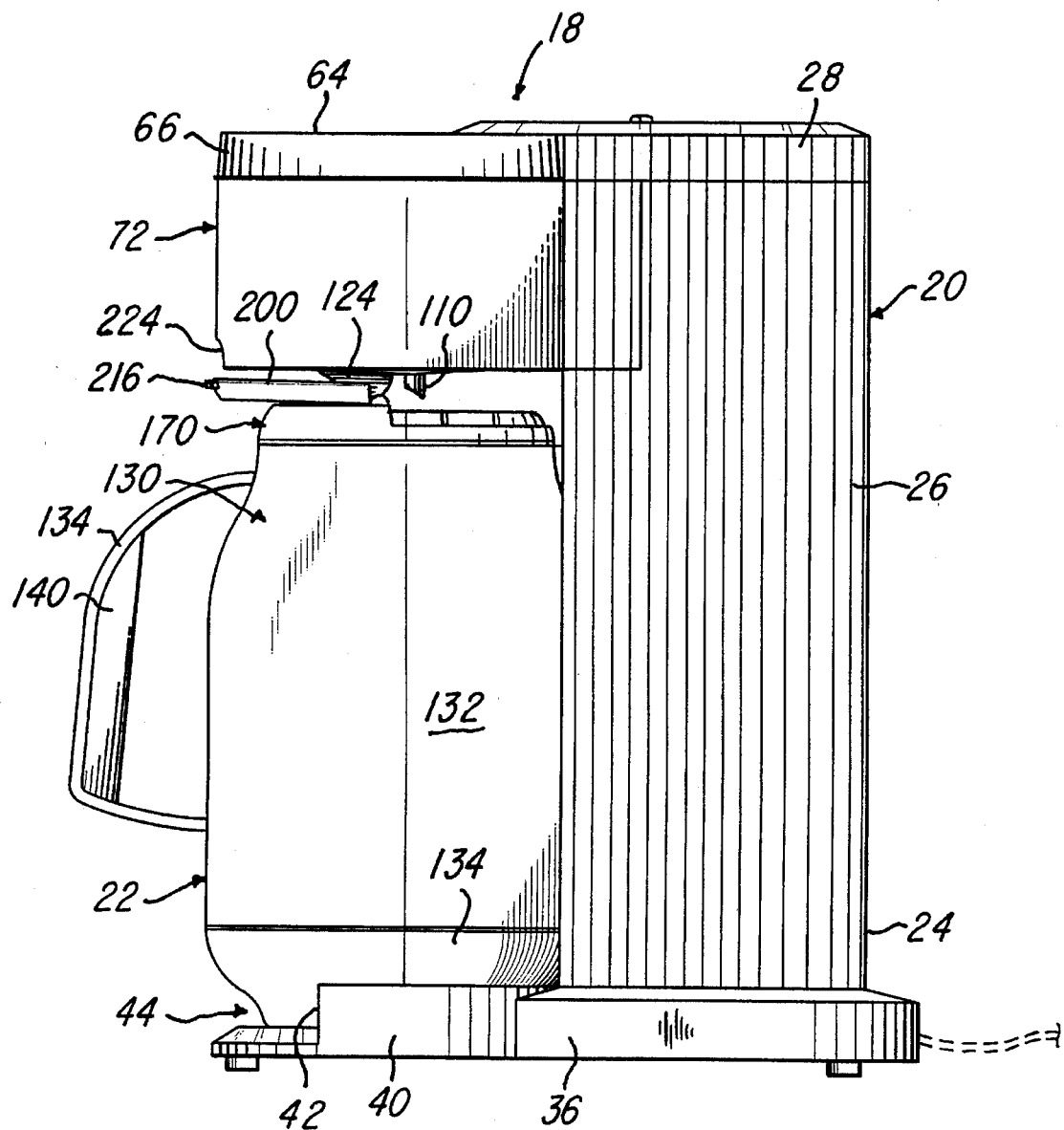
FIG. 3 is a right side elevational view of the coffeemaker and carafe assembly of FIG. 1.

With reference to FIGS. 1, 2 and 3, a coffeemaker and carafe assembly, generally designated 18, in accordance with this invention comprises a coffeemaker, generally designated 20, and a thermal carafe, generally designated 22, for use therewith.

Referring now to FIGS. 1 through 6, the coffeemaker 20 comprises a housing 24 made from a suitable plastic material, such as polypropylene, forming a generally vertical tower 26, a top cover 28 that defines a fill port 30 (FIG. 4) which opens from above the top cover 28 into a water reservoir 32 located within the upper end of the tower 26.

The fill port 30 is normally closed by a pivotal dust cover 34 mounted on the top cover 28. The dust cover 34 may be pivoted to a position shown in FIG. 4 to enable a user to pour water directly into the reservoir 32. The housing 24 also forms a platform 36 which extends generally horizontally from the lower end of the tower 26. When coffee is being brewed, as will discussed below, the carafe 22 is nested in a shallow, upwardly-facing recess 38 (FIG. 2) formed centrally of the platform 36. An upright, cylindrical wall 40 having end faces 42 separated by an open gap 44 partly surrounds the platform 36 and helps to guide the carafe 22 into the proper position on the platform 36 for reasons which will become evident. The bottom of the housing 24 is preferably closed by a metal plate (not shown).

In operation, water in the reservoir 32 is heated by a conventional automatic drip heater assembly 46 from which it travels up a hot water delivery tube 48 over a spreader plate 50 that extends generally horizontally from the tower 26 in overlying relation to the platform 36. The heated water falls through hot water exit apertures 52 in the spreader plate 50 into a funnel or brew basket 56 onto coffee grounds located with a paper or other filter (not shown) deposited in the brew basket 56, to produce brewed coffee. The brewed coffee flows from the brew basket 56 into the carafe 22 as will be further discussed below.

In accordance with the preferred practice of this invention, the spreader plate 50 is formed of plastic and injection molded in one piece with the reservoir 32. Furthermore, the reservoir 32 is suspended within the tower 26 by means of an inverted U-shaped rim 58 that is snugly placed over the top edge of the tower 26. The heating assembly 46 is located in the tower 26 below the reservoir 32 and receives water from the reservoir 32 through a check valve extending downwardly from the bottom wall of the reservoir 32, as is conventional.

The top cover 28 extends not only over the tower 26 but also over the spreader plate 50 and has a depending skirt 62 with integral ribs 54 that cooperate with the upper wall portions of the tower 26 to properly align and relatively position the tower 26 and the top cover 28. Plural hooks 60 extending integrally upwardly from the top rim of the tower 26 cooperate with mating surfaces 63 of the skirt 62 of the top cover 28 to frictionally retain the top cover 28 in assembled relation to the tower 26 and the spreader plate 50. The portion, designated 64, of the top cover 28 that overlies the spreader plate 50 has a depending circular wall 66 with ribs 68 (FIG. 6) that frictionally bear against the outside surface of a vertically extending, circular wall 70 formed on the spreader plate 50.

The funnel or brew basket 56 is supported in alignment with the spreader plate 50 within a hollow, cylindrical funnel or brew basket holder 72 pivotally connected to the tower 26. More precisely, in the illustrated embodiment, the housing tower 26 has a vertically-extending, recessed pocket 74 opening to one side thereof defined in part by an upwardly facing shoulder 76 having a pivot aperture 78, and in part by a semicircular plate 80 molded integrally with the reservoir 32 that has a pivot aperture 82 vertically aligned with the pivot aperture 78. The brew basket holder 72 has a generally radially outwardly projecting, integral mounting plate 84 provided with a depending, lower pivot pin 86 and an upstanding, upper pivot pin 88 that cooperate, respectively, with the pivot apertures 78 and 82 to provide for the pivotal mounting of the brew basket holder 72.

A horizontal, radially outwardly projecting, circumferential flange 90 substantially completely surrounds the top of the brew basket 56 and the upper end of the brew basket holder 72 includes a top wall 92 which includes a horizontal, radially inwardly projecting, circumferential flange 94. When these parts are assembled for brewing, the brew basket 56 is suspended from the holder 72 by virtue of the interengagement between the downwardly-facing surface of the brew basket flange 94 and the upwardly-facing surface of the top margin 92 of the holder 72.

For reasons which will be described below, the orientation of the brew basket 56 about its vertical centerline is important to the operation of the coffeemaker and carafe assembly 18 of this invention. Accordingly, with reference to FIGS. 4, 5 and 6, the sidewall of the brew basket 56 has three mutually circumferentially-spaced, outwardly-extending alignment tabs 96 that must be circumferentially aligned with three mutually circumferentially-spaced alignment recesses 98 in the top wall 92 of the brew basket holder 72 in order for the entire circumference of the outwardly projecting brew basket flange 90 to rest on the holder top wall 92. The recesses 98 are mutually circumferentially spaced apart by angles other than 120 degrees so that there is only one rotational orientation of the brew basket 56 in which it is satisfactorily aligned to be assembled on its holder 72. To assist the user in aligning the brew basket 56 with its holder 72, small openings 99 are provided in the brew basket flange 90 over the alignment tabs 96 so that the latter are visible from above.

The alignment tabs 96 are spaced below the flange 90 extending around the top of the brew basket 56 so that, after the brew basket 56 is assembled onto the holder 72, the brew basket 56 may be rotated to a position in which the alignment tabs 96 and the recesses 98 are no longer aligned. For reasons which will be described below, this is desirable in order to prevent substantial relative vertical movement between the brew basket 56 and the holder 72 during a brewing cycle. In order to achieve the optimal relative rotary orientation between the brew basket 56 and the holder 72, a key 100 projects upwardly from the holder top wall 92 and interfits with a notch 102 formed in the outer margin of the flange 90 at the upper end of the brew basket 56. The notch 102 extends through a circumferential angle which is greater than needed simply for purposes of alignment. When the user first aligns the brew basket 56 with the holder 72 and lowers the brew basket 56 onto the holder 72, the key 100 is located within the portion of the notch 102 which is in vertical alignment with associated alignment recess 98 in the top wall 92 of the holder 72. The user can then achieve the desired optimal alignment between the brew basket 56 and the holder 72 by rotating the brew basket 56 until the opposite end of the notch 102 is aligned with the key 100. Such rotation of the brew basket 56 also moves the alignment tabs 96 out of alignment with their respective alignment recesses 98 so that a type of bayonet lock is provided between the brew basket holder 72 and the brew basket 56 that prevents substantial relative vertical movements between them.

Figure 4:
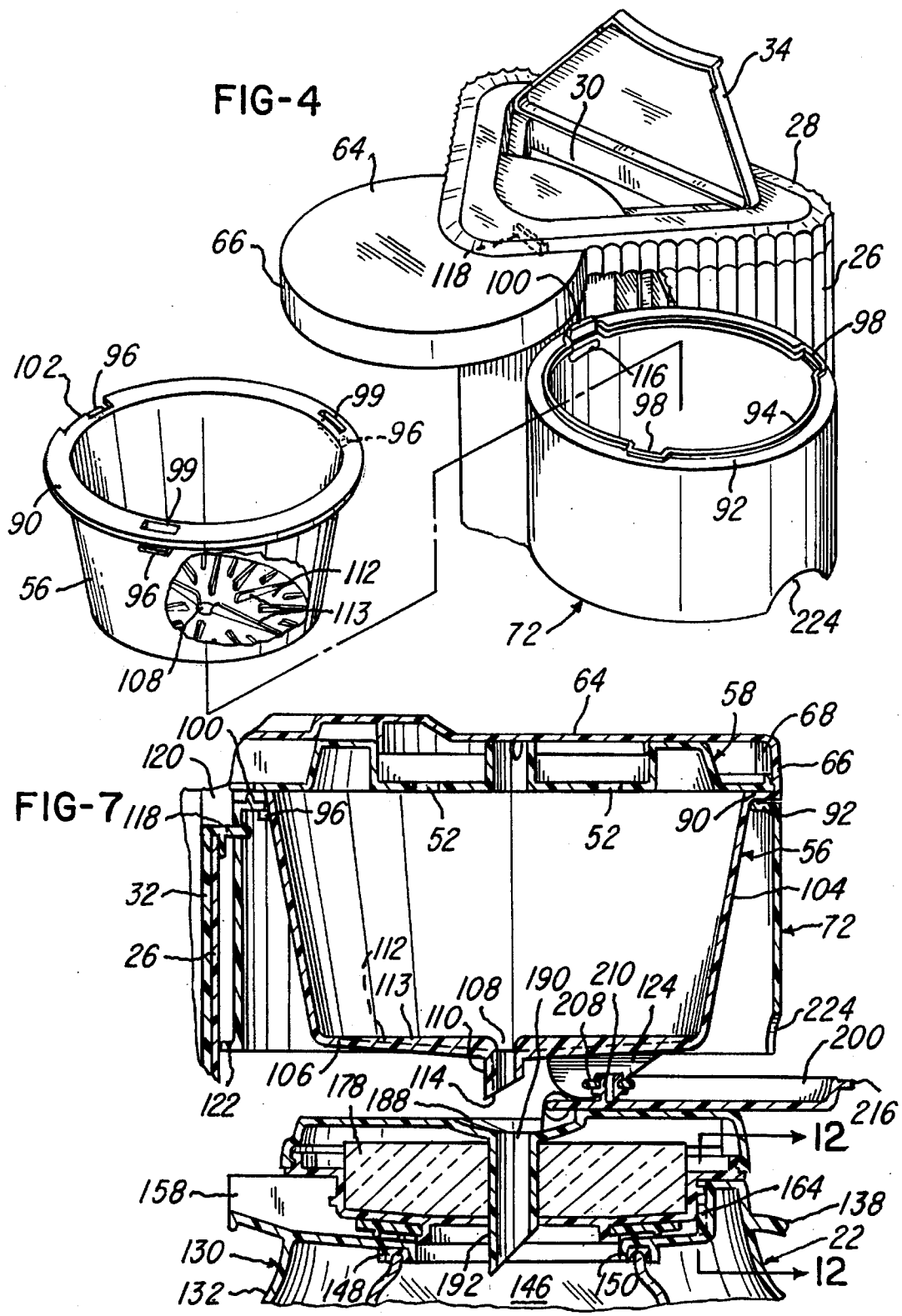
FIG. 4 is a fragmentary, partly exploded perspective view, with parts broken away, looking generally from in front and above, of a portion of the coffeemaker forming part of the coffeemaker and carafe assembly of FIG. 1.
Figure 5:
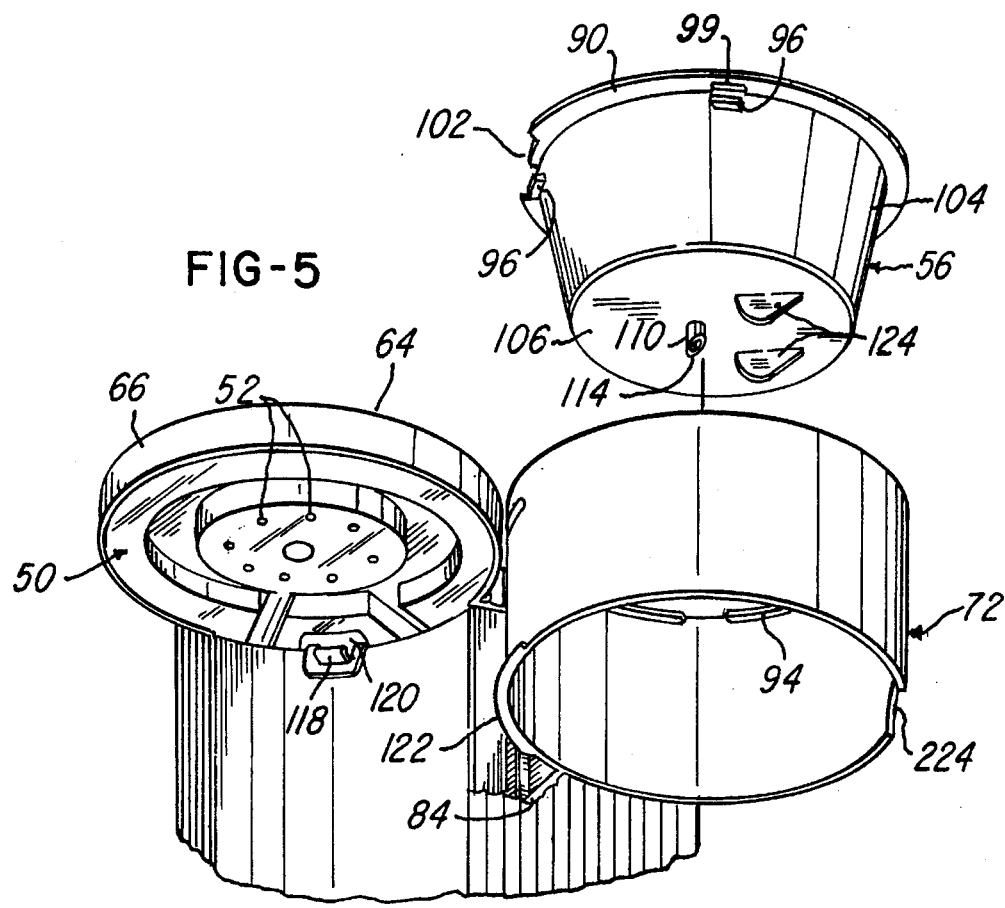
FIG. 5 is a fragmentary, partly exploded perspective view of the same portion of the coffeemaker illustrated in FIG. 4, but looking up from in front and below.

With reference to FIGS. 4, 5 and 7, the brew basket 56 has a sidewall 104 in the form of a truncated cone and a bottom wall 106 which defines a brewed coffee outlet 108, an outlet pipe 110 in liquid communication with the brewed coffee outlet 108 depending vertically from the bottom wall 106. The bottom wall 106 has sloping upper surfaces 112 along which coffee brewed within the brew basket 56 flows to the outlet 108 and into the outlet pipe 110. As conventional, bottom wall 106 also has upstanding ribs 113 which support a coffee filter (not shown) above the surfaces 112. For reasons which will be discussed below, the lower end of the outlet pipe 110 is bevelled to form a bottom surface 114 that slopes downwardly and rearwardly when the brew basket 56 is located in position for a brewing operation.

The brew basket holder 72 and the brew basket 56, especially when holding coffee grounds, constitutes a substantial weight which applies a downward bending moment on the brew basket holder 72. Accordingly, and with reference to FIGS. 4 through 7, the wall of the brew basket holder 72 preferably has an aperture 116 that receives a hook-like projection 118 which extends forwardly from the reservoir 32 through an overflow opening 120 in the front top of the tower 26, and contributes support to the brew basket holder 72 when in operative position for brewing. To the same end, and with reference to FIGS. 5 and 7, the brew basket holder 72 is preferably provided with a bearing flange 122 that bears against the confronting surface of the tower 26 when the basket holder 72 is in its operative position for brewing. As is believed apparent, the tower 26 cooperates with the bearing flange 122 to hold the brew basket holder 72 in an upright orientation.

Further support for the brew basket 56 and its holder 72 in the brewing position is provided by a pair of support plates 124 which depend from the bottom wall 106 of the brew basket 56. As will become apparent, the support plates 124 are supported from below by the thermal carafe 22 when the parts are in their brewing positions.

The inside of the reservoir 32 can advantageously be marked to indicate the water levels therein. Such marking is not illustrated herein but is preferably located on the inside rear wall of the tower 26 in a position in which it is readily viewed through the fill port 30. Excessive overfilling of the reservoir 26 is prevented by the above-mentioned overflow opening 120 in the front of the tower 26 and by another overflow opening 126 in the rear of the tower.

With reference to FIGS. 2, 3 and 9 through 11, the thermal carafe 22 comprises an outer housing 130 which can conveniently be injection molded from a suitable plastic material, such as polypropylene, in two parts, namely an upper housing part 132 and a lower housing part 134. The two housing parts 132 and 134 are preferably formed with cooperating screw threads 136, shown in FIG. 10, which are screwed together to form an integral construction. A suitable handle 138 is molded integrally with the upper housing part 132. A gripping member 140 having a tacky gripping surface, such as can be made from a thermoplastic rubber such as rubberized polypropylene, is desirably incorporated in the handle 138. The upper end of the upper housing part 132 is formed with an upper carafe wall 142 that defines a carafe opening or port 144. An insulated brewed coffee container 146 is confined within the hollow interior of the outer housing 130 between a sealing ring 148 located within a downwardly-facing channel 150 formed on the bottom surface of the upper carafe wall 142 and upwardly-facing surfaces of a tuner 152 that is threadedly mounted within a threaded bore 154 in the bottom center of the lower housing part 134. The sealing ring 148 seals against the neck of the insulated container 146 whereas the tuner 152 is adjustable by rotation relative to the threaded bore 154 to accommodate variations in the overall height of the insulated container 146. The insulated container 146 is shown in simplified form and preferably comprises a suitable, conventional, double-walled glass vacuum bottle.

The uppermost portion of the carafe housing 130 is formed to provide an upwardly-projecting, cylindrical neck 156 that surrounds the carafe opening 144, except for a gap therein which forms, along with the top surface of the upper carafe wall 142, a pour spout 158. The inwardly facing surface of the neck 156 is provided with spaced pairs of internal screw threads 160 and 162. The neck 156 further includes a vertical stop boss 164 that extends radially of the inwardly facing surface of the neck 156 midway between the pairs of internal screw threads 160 and 162 and diametrically opposite the pour spout 158.

Further in accordance with this invention, a removable carafe top lid, generally designated 170, is provided that comprises a lower housing part 172 and an upper housing part 174, each made from a suitable plastic material such as polypropylene, which between them define a central chamber 176 within which a disc 178 of suitable thermal insulating material, such as a styrofoam, is confined. The lower lid housing part 172 is provided with a single external screw thread 180 that is sized to interfit with the internal screw threads 160 and 162 on the housing neck 156. The lower lid housing part 172 is also provided with a suitable compressible sealing gasket 182 made, for example, from a silicone rubber, that is received within a groove 184 formed on the bottom of the lower lid housing 172 and has a raised rib 183 which is adapted to seal against the carafe upper wall 142 in surrounding relation to the carafe opening 144.

The upper lid housing part 174 has a centrally located depression or well 188 with a central opening 190 to a depending brewed coffee conduit 192 that extends downwardly through the insulating disc 178 and the lid lower housing part 172. Accordingly, when the top lid 170 is assembled onto the carafe 22, brewed coffee can flow downwardly through the brewed coffee conduit 192 into the brewed coffee container 146. To form a unitary lid construction, the lower lid housing part 172 may be press fit onto the brewed coffee conduit 192 and the two housing 172 and 174 parts preferably have interfitting ribs or the like (not shown) which snap fit together.

Figure 11:
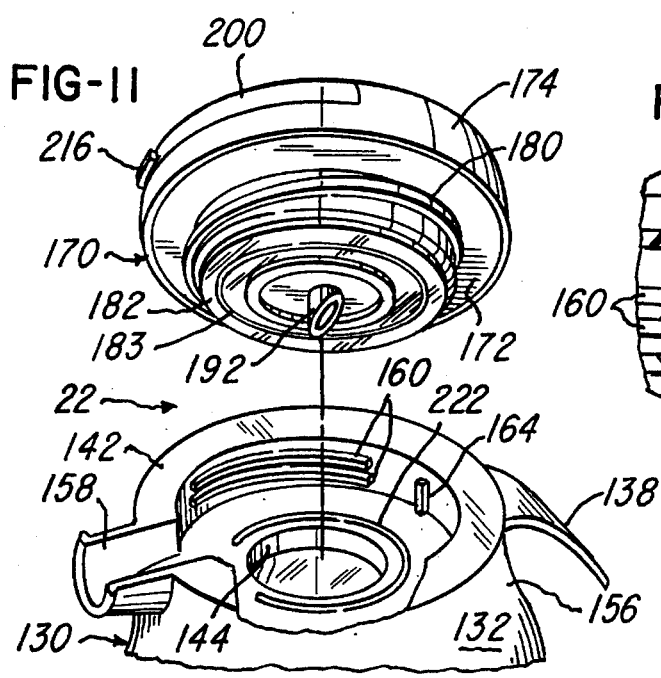
FIG. 11 is a fragmentary perspective view of the upper portion of the carafe showing its lid exploded away from its body.

A lid cover 200 is pivotally mounted on the top of the carafe top lid 170 for movement through substantially 180 degrees between a closed position shown in FIGS. 8, 9 and 11, in which the lid cover 200 covers the central opening 190 and a second, open, position shown in FIGS. 1 through 3 and 7, in which the lid cover 200 is pivoted away from the central opening 190 so that the central opening 190 is exposed. As shown best in FIG. 13, the lid cover 200 has aligned but oppositely projecting pivot pins 202 that are snap fit into cooperating and mutually aligned recesses 204 (only one of which is shown) located in upstanding bosses 206 on the upper lid housing part 174.

As is apparent, the lid cover 200 must be in the second, open position shown in FIGS. 1 through 3 and 7 in order for brewed coffee to flow from the brew basket 56 into the carafe 22. The lid cover 200 is preferably in the closed, position illustrated in FIGS. 8, 9 and 11 to prevent heat from venting upwardly from the carafe after the completion of a brewing cycle. To this purpose, a sealing ring 208 is mounted on a post 210 extending from the lid cover 200 for sealing around the central opening 190 and the cover is provided with a rib 212 that snaps fits with a cooperating rib 214 on the upper lid housing part 174. A finger-engageable handle 216 is formed on the outer margin of the lid cover 200 to assist the user in pivoting the lid cover 200 to expose the central opening 190. In the closed position of the lid cover 200, interfitting ribs 218 on the lid cover 200 and recesses 220 in the upper lid housing part 174 contribute to the frictional engagement between the lid cover 200 and the top lid housing part 174.

Figure 12:
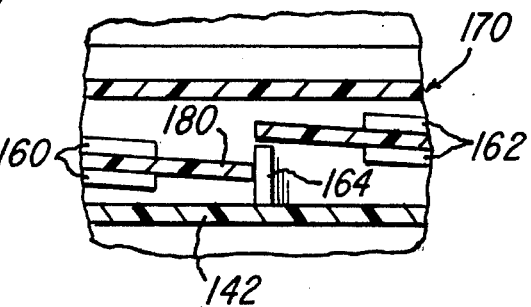
FIG. 12 is a fragmentary, cross sectional view, taken on section lines 12—12 of FIG. 7, showing a portion of the carafe when the carafe is closed by its lid, and shows interengaging parts of the carafe housing and the lid.

In use, the top lid 170 can be screwed onto the carafe neck 156 to bring the sealing gasket 182 into engagement with the upper surface of the carafe upper wall 142 in order to seal the top lid 170 to the carafe upper wall 142, as shown in FIG. 8. The rotational movement of the top lid 170 toward a sealing engagement with the carafe upper wall 142 can continue until the leading end of the external thread 180 engages the stop boss 164, as shown in FIG. 12. This is sufficient to compress the sealing gasket 182 into intimate, sealing engagement with the carafe upper wall surfaces surrounding the carafe opening.

In order to pour brewed coffee from the carafe 22, the carafe top lid 170 can be partly unscrewed to remove the sealing gasket 182 from sealing engagement with the carafe upper wall 142, as shown in FIG. 9. When the sealing gasket 182 is not engaged with the carafe upper wall 142, brewed coffee can, when the carafe 22 is tilted, flow from the inside of the insulated brewed coffee container 146 through the carafe opening 144 and out through the pour spout 158. A shallow rib 222 partly surrounding the carafe opening 144 helps to channel the flow of the brewed coffee to the pour spout 158. The cooperating neck threads 160 and 162 and lid thread 180 are preferably so designed that a rotation of the carafe top lid 170 by 180 degrees is sufficient to enable brewed coffee to be poured from the carafe 22. Suitable indicia (not shown) can be marked on the top surface of the top lid 170 to indicate its fully closed position and a position which is adequately opened for pouring.

A particularly vexatious problem confronted in connection with the invention of the coffeemaker and carafe assembly 18 was a tendency for a vapor lock to be created that prevented the brewed coffee from entering the restricted orifice provided by the brewed coffee conduit 192. It is desirable that the conduit 192 have a small diameter to prevent heat from escaping during the brewing process, and to simplify the way in which the conduit can be sealed shut when the carafe 22 is removed from the coffeemaker platform 36. A satisfactory solution is to provide a central opening 190 to the conduit 192 with a diameter of at least nine millimeters and to so construct the carafe top lid 170 and the brew basket outlet pipe 110 that the brewed coffee will not enter directly into the conduit 192 but, rather, will flow downwardly along the sloping surfaces of the depression 188 partly surrounding the central opening 190 and then into the opening 190. For this reason, as can be seen in FIG. 7, the brew basket outlet pipe 110 is laterally offset from the carafe lid central opening 190 to the brewed coffee conduit 192. In addition, the fact that the lower end of the brew basket outlet pipe 110 is bevelled as described above causes the brewed coffee flowing down the outlet pipe 110 to flow to the left, as viewed in FIG. 7, rearwardly toward the depression 188. A reasonably accurate positioning of the carafe 22 during brewing is necessary to obtain the benefit of the bevelled outlet surface 114. If the beveled surface 114 were reversed from that shown in FIG. 7, a vapor lock might be created during brewing because the brewed coffee might enter directly into the conduit opening 190. Furthermore, the brewed coffee would be directed toward the lid cover 200 which could cause some of the brewed coffee to accumulate on the top lid 170 rather than flow through it.

Preferably, the overall height of the carafe 22, including its lid 170 and lid cover 200 when in its open position, is just slightly less than the vertical spacing between the brew basket holder 72 and the platform 36. In practice, the lid cover 200 may not lie entirely flat in its open position. To accommodate the open lid cover 200, the bottom edge of the brew basket holder 72 has a notch 224 which receives the middle edge portion of the lid cover 22 when the holder 72 is positioned for brewing.

When placing the carafe 22 on the platform 36 in preparation for brewing, one must necessarily move the carafe lid cover 200 to its open position to enable the brewed coffee to enter the carafe 22 and the carafe lid 170 should be fully screwed onto the carafe neck 156 so that the lid 170 is sealed in surrounding relation to the carafe opening 144. If the carafe 22 then positioned on the platform 36 and oriented such that its pour spout 158 is aligned with and closely confronts the center of the front face of the tower 26, the brewed coffee will properly flow rearwardly from the brew basket outlet pipe 110 toward the tower 26 because of the bevelled outlet pipe surface 114 as described. The desired orientation of the carafe 22 is almost assured because any other orientation of the carafe 22 would so position the lid cover 200 that its movement toward the tower 22 as the carafe 22 is advanced toward the platform 36 would be partly obstructed by the brew basket holder 72. Such interference will be awkward for the user who will thereby be warned that the parts are not properly assembled for brewing.

It will be noted from FIG. 7 that the depending support plates 124 engage the open lid cover 200. Accordingly, the carafe 22, when located in position to receive brewed coffee, contributes to the support of the brew basket 56 and its holder 72. These several elements contribute to the support of the brew basket 56 and its holder 72 during brewing, enable the use of the simple and inexpensive pivotal mounting of the brew basket holder 72 described above.

Although the presently preferred embodiments of this invention have been described, it will be understood that within the purview of the invention various changes may be made within the scope of the following claims.

Having thus described our invention, we claim:

1. A coffeemaker and carafe assembly comprising:
   a coffeemaker comprising:
      a housing,
      a water reservoir in said housing,
      said housing having a top cover defining a fill port which opens to said water reservoir,
      an automatic drip heater assembly in said housing communicating with said reservoir
      a platform for a carafe,
      a spreader plate located in said housing above said platform,
      a hot water delivery tube connecting said heater assembly to the top of said spreader plate for delivering heated water thereto, and
      a brew basket removably supported by said housing below said spreader plate, said brew basket having a bottom wall which defines a brewed coffee outlet, an outlet pipe in liquid communication with said brewed coffee outlet depending vertically from said bottom wall, said bottom wall having sloping surfaces which form a funnel which opens to said brewed coffee outlet along which coffee brewed within said brew basket flows into said outlet pipe; and
   a thermal carafe comprising:
      a housing,
      an insulated brewed coffee container mounted in said housing,
      a removable top lid threadedly connected to the top of said housing and including a gasket for sealing to said housing when said carafe lid is threaded completely onto said housing,
      a brewed coffee conduit having an opening to the top of said lid and extending through said lid, said conduit having a diameter sufficiently large to impede creation of a vapor lock when brewed coffee flows from said brew basket outlet pipe to said conduit, said opening being partly surrounded by a depression with surfaces sloping to said opening, a lid cover pivotally mounted on the top of said carafe lid for movement between a closed position in which said lid cover covers said conduit and an open position in which said lid cover exposes said conduit.

2. A coffeemaker and carafe assembly in accordance with claim 1 wherein said lid cover has a sealing gasket adapted to engage the top of said lid in surrounding relation to said opening to said conduit.

3. A coffeemaker and carafe assembly in accordance with claim 2 wherein said lid cover and said lid have interengaging snap fit surface portions which hold said lid cover in its closed position.

4. A coffeemaker and carafe assembly in accordance with claim 1 further comprising a brew basket holder pivotally mounted on said housing, said brew basket being suspended in said holder, and wherein said holder and said basket have surfaces which interfit to orient the brew basket in a predetermined rotary position about a generally vertical axis.

5. A coffeemaker and carafe assembly in accordance with claim 4 wherein said holder and said basket have interengaging surfaces which prevent substantial relative vertical movement between them.

6. A coffeemaker and carafe assembly in accordance with claim 1 wherein said outlet pipe is constructed to direct brewed coffee from said outlet pipe toward said depression so that the brewed coffee flows down said sloping surfaces into said conduit.

7. A thermal carafe comprising:

a housing, an insulated brewed coffee container mounted in said housing, a removable top lid threadedly connected to the top of said housing and including a gasket for sealing to said housing when said carafe lid is threaded completely onto said housing, a brewed coffee conduit having an opening to the top of said lid and extending through said lid, said conduit having a diameter sufficiently large to impede creation of a vapor lock when brewed coffee flows from said brew basket outlet pipe to said conduit, said opening being partly surrounded by a depression with surfaces sloping to said opening, a lid cover pivotally mounted on the top of said carafe lid for movement between a closed position in which said lid cover covers said conduit and an open position in which said lid cover exposes said conduit.

8. A thermal carafe in accordance with claim 7 wherein said lid cover has a sealing gasket adapted to engage the top of said lid in surrounding relation to said opening to said conduit.

9. A thermal carafe in accordance with claim 8 wherein said lid cover and said lid have interengaging snap fit surface portions which hold said lid cover in its closed position.

* * * * *